US010523580B2

(12) United States Patent
Abuelsaad et al.

(10) Patent No.: US 10,523,580 B2
(45) Date of Patent: Dec. 31, 2019

(54) AUTOMATIC CLOUD PROVISIONING BASED ON RELATED INTERNET NEWS AND SOCIAL NETWORK TRENDS

(71) Applicant: International Business Machines Corporation, Armonk, NY (US)

(72) Inventors: Kelly Abuelsaad, Poughkeepsie, NY (US); Shane B. McElligott, Apex, NC (US); Hien Q. Nguyen, Beaverton, OR (US); Susan M. Romero, Bergenfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/044,874

(22) Filed: Feb. 16, 2016

(65) Prior Publication Data
US 2016/0164798 A1    Jun. 9, 2016

Related U.S. Application Data

(63) Continuation of application No. 13/365,466, filed on Feb. 3, 2012, now Pat. No. 9,280,394.

(51) Int. Cl.
*G06F 9/50* (2006.01)
*H04L 12/911* (2013.01)
*H04L 12/24* (2006.01)
*H04L 29/08* (2006.01)

(52) U.S. Cl.
CPC ............ *H04L 47/70* (2013.01); *G06F 9/5072* (2013.01); *H04L 41/0806* (2013.01); *H04L 67/02* (2013.01); *H04L 67/10* (2013.01); *G06F 2209/5019* (2013.01)

(58) Field of Classification Search
CPC .............. H04L 47/70; H04L 41/0806; G06F 2209/5019; G06F 9/50; H04M 3/5191
USPC ...... 718/104; 713/300; 379/265.09; 709/226
See application file for complete search history.

(56) References Cited

U.S. PATENT DOCUMENTS

| | | | |
|---|---|---|---|
| 6,876,988 B2 | 4/2005 | Helsper et al. | |
| 2004/0181794 A1 | 9/2004 | Coleman et al. | |
| 2009/0119673 A1* | 5/2009 | Bubba ........................ | G06F 9/50 718/104 |

(Continued)

FOREIGN PATENT DOCUMENTS

WO    2005045678 A2    5/2005

*Primary Examiner* — Kyung H Shin
(74) *Attorney, Agent, or Firm* — Cahn & Samuels, LLP (57) ABSTRACT

An embodiment of the invention provides a system and method for managing computing resources in a cloud computing environment, wherein the system includes a data analysis module connected to a processor. The data analysis module predicts the demand for the computing resources, wherein the demand is predicted based on internet user activity. The internet user activity includes: the number of web pages that include at least one select term a predetermined amount of times, the number of times the web pages that include the at least one select term a predetermined amount of times are viewed, and the number of times the select term is entered into an internet search engine. The processor increases resource capacity in the cloud computing environment when the predicted demand is above a first threshold. The processor decreases resource capacity in the cloud computing environment when the predicted demand is below a second threshold.

18 Claims, 4 Drawing Sheets

(56) References Cited

U.S. PATENT DOCUMENTS

2013/0136253 A1\* 5/2013 Liberman Ben-Ami ............... H04M 3/5191
379/265.09

\* cited by examiner

FIG. 4 it application Ser. No. 13/365,466 filed on Feb. 3,
AUTOMATIC CLOUD PROVISIONING BASED ON RELATED INTERNET NEWS AND SOCIAL NETWORK TRENDS This patent application is a continuation application of U.S. patent application Ser. No. 13/365,466 filed on Feb. 3, 2012, which is hereby incorporated by reference.

BACKGROUND

The present invention is in the field of systems, methods, and computer program products for automatic cloud provisioning based on related Internet news and social network trends.

Cloud computing is a comprehensive solution that delivers information technology as a service. It is an Internet-based computing solution where shared resources are provided like electricity distributed on the electrical grid. Computers in the cloud computing environment are configured to work together and the various applications use the collective computing power as if they are running on a single system.

SUMMARY OF THE INVENTION

An embodiment of the invention provides a system and method for managing computing resources in a cloud computing environment, wherein the system includes a data analysis module connected to a processor. The data analysis module predicts the demand for the computing resources, wherein the demand is predicted based on internet user activity. The internet user activity includes: the number of web pages that include at least one select term a predetermined amount of times, the number of times the web pages that include the at least one select term a predetermined amount of times are viewed, and the number of times the select term is entered into an internet search engine. The processor increases resource capacity in the cloud computing environment when the predicted demand is above a first threshold. Moreover, the processor decreases resource capacity in the cloud computing environment when the predicted demand is below a second threshold.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

At least one embodiment of the invention provides a system for predicting capacity requirements in a cloud computing environment and reacts to the predicted capacity requirements by provisioning or deprovisioning resources based on information about the latest trends of data surfacing on the Internet related to a system, application or website running in the cloud computing environment. More specifically, the system can be configured to receive data from several different applications that analyze Internet trends, such as popularity and chatter on/among social networking sites, news stories, advertisements, and more. Furthermore, the system can be configured to recognize certain patterns of increased or decreased popularity in a certain area, and how the system should react, by automatically provisioning or deprovisioning resources in the cloud computing environment. In at least one embodiment, the system includes an engine that can call application program interfaces (APIs) and/or interfaces of at least one cloud computing environment, and send resource increase or decrease requests based on the rules it has configured. Therefore, the system allows an owner of a system in the cloud computing environment to predict and prepare for surges of load ahead of time and to ensure that no interruption of service occurs, rather than attempt to deal with situations of high demand as they occur.

Figure 1:
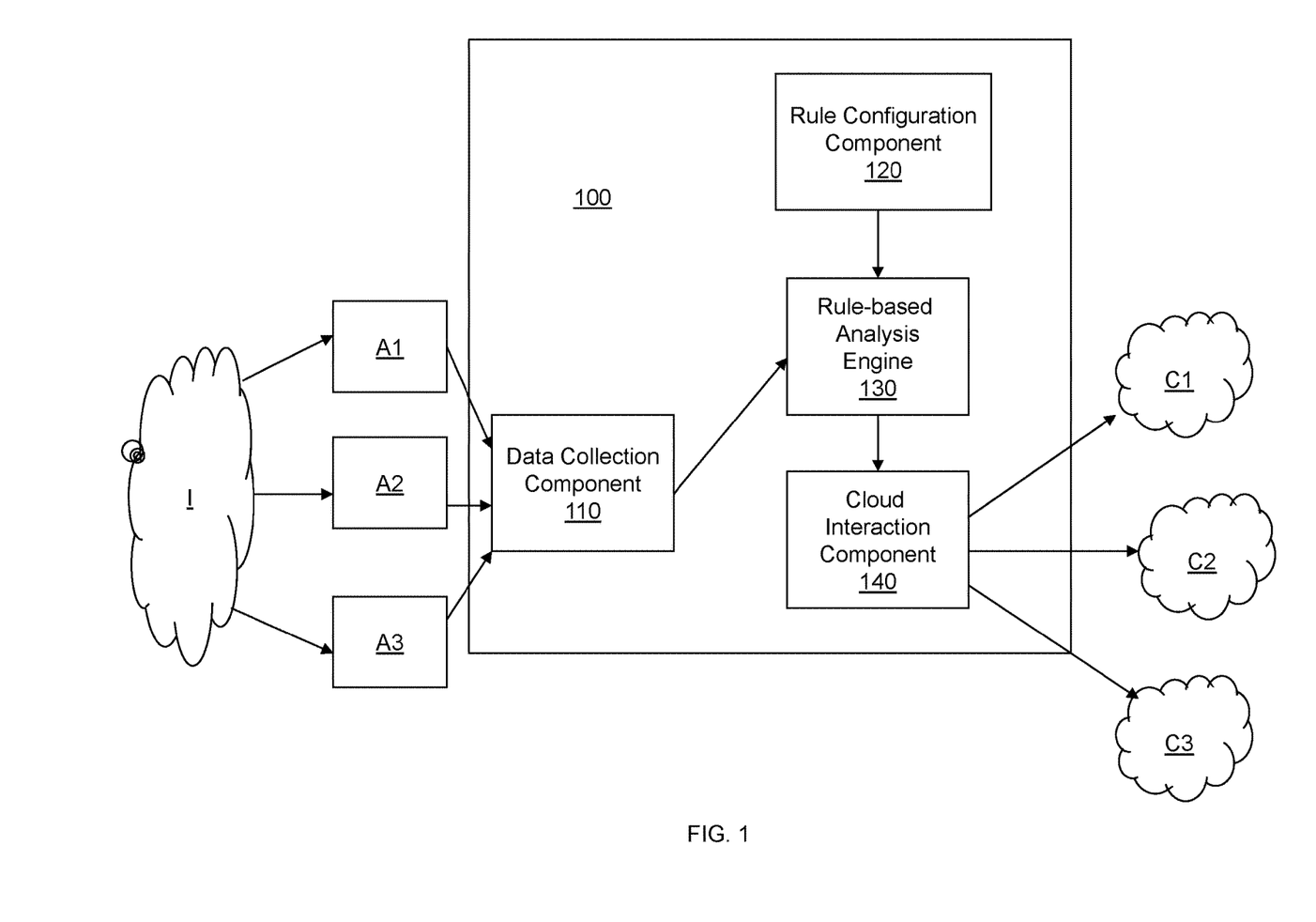
FIG. 1 illustrates a system for predicting and reacting to capacity requirements in a cloud computing environment according to an embodiment of the invention.

FIG. 1 illustrates a system 100 for predicting and reacting to capacity requirements in a cloud computing environment according to an embodiment of the invention. The system 100 includes a data collection component 110 that collects data from existing applications that crawl the Internet I. Examples of such applications include a social network trend analysis application A1, a news trend analysis application A2, and a search engine trend analysis application A3. The data collection component 110 compiles trend information from various sources on the Internet I, such as social networks, news stories, and search engines. The various sources can be configurable.

The system 100 includes a rule configuration component 120 that allows a user to specify one or more data input parameters, one or more conditions, and one or more rules to be executed when the data from identified input parameters cause certain conditions to be met. In at least one embodiment, a user can specify an input parameter defining the cloud computing environment(s) to be managed, e.g., a first customer cloud C1, a second customer cloud C2, and/or a third customer cloud C3 as well as the current capacities of their deployed cloud resources. A second input parameter can define the information to be extracted from the data collection component 110, e.g., the terms that have been discussed on social networking sites more than a predetermined number of times. A condition can then be created which defines the threshold for terms or subjects, e.g. terms X, Y, or Z have been discussed on one or more particular social networking sites more than 1,000 times in the past n amount of hours or days. A second condition can be defined. A rule can then be defined to identify actions to be taken if a particular defined condition is met, e.g., if terms X, Y, or Z have been entered into Internet search engines less than 1,000 times, and customer cloud C3 currently has more capacity deployed than is needed to support the decreased popularity of the site as indicated by social network chatter and/or internet searches, then send a deprovision instruction to the third customer cloud C3. The rule configuration component 120 provides an open-ended configuration system where a user can establish any number of parameters, conditions, and/or rules to perform the provision or deprovision tasks in the cloud.

A rule-based analysis engine 130 (also referred to herein as a "processor") is connected to the rule configuration component 120 and the data collection component 110. As used herein, the term "connected" includes operationally connected, logically connected, in communication with, physically connected, engaged, coupled, contacts, linked, affixed, and attached. The rule-based analysis engine 130 analyzes and compares the rules from the rule configuration component 120 and the collected data from the data collection component 110 to decide what actions should be taken.

A cloud interaction component 140 (also referred to herein as a "computing resources managing module") is connected to the rule-based analysis engine 130. The cloud interaction component 140 takes actions that are produced by the rule-based analysis engine 130 and invokes them in the cloud computing environment. The cloud interaction component 140 can interface with many different types of cloud computing environments, e.g., by invoking an API or interface that is particular to that cloud solution.

Figure 2:
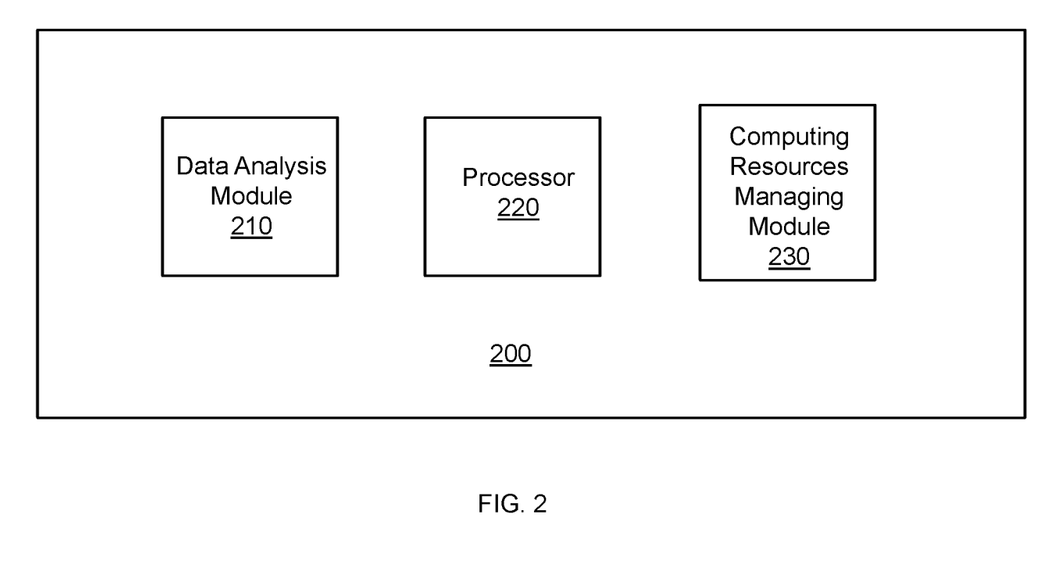
FIG. 2 illustrates a system for managing computing resources according to an embodiment of the invention.
Figure 3:
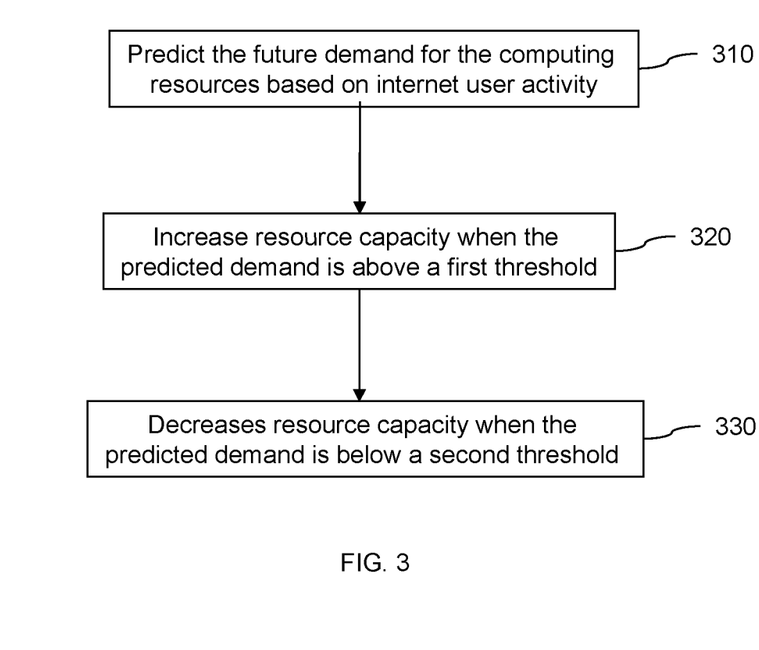
FIG. 3 is a flow diagram illustrating a method for managing computing resources according to an embodiment of the invention.

FIG. 2 illustrates a system 200 for managing computing resources according to an embodiment of the invention. In at least one embodiment, the computing resources include servers, virtual machines, applications, and/or middleware in a cloud computing environment. FIG. 3 is a flow diagram illustrating a method for managing computing resources, for example, using the system 200, according to an embodiment of the invention. The system 200 includes a data analysis module 210 connected to a processor 220.

The data analysis module 210 predicts the future demand for the computing resources based on internet user activity 310. The internet user activity can include the number of web pages that contain one or more select terms a predetermined amount of times. For example, the internet user activity can include data indicating that over 600 web pages contain the term "election" five or more times. In another example, the data can indicate that over 250 web pages contain the terms "election" and "campaign" at least once. The web pages can include social networking websites, business networking websites, news stories, discussion forums, and/or advertisements (e.g., banner advertisements, pop-up advertisements).

The internet user activity can also include the number of times that web page(s) that contain a select term a predetermined amount of times are viewed. For example, the internet user activity can include data indicating that web pages containing the term "hurricane" at least once have been viewed less than 5,000 times in the past 48 hours.

Furthermore, the internet user activity can include the number of times a select term is entered into internet search engine(s). For example, the internet user activity can include data indicating that the terms "Halloween" and "costumes" have been entered into internet search engine less than 1,000 times in the past 24 hours.

The processor 220 (also referred to herein as a "rule-based analysis engine") increases resource capacity when the predicted demand is above a first threshold 320. In at least one embodiment, resource capacity is increased by provisioning at least one additional computing resource. In another embodiment, the resource capacity is increased by adding (e.g., allocating additional or physically/manually installing additional) physical memory, virtual memory, physical CPU, virtual CPU, network capacity, instances of middleware on a virtual machine, instances of applications on a virtual machine, and/or storage space to the computing resources. For example, when the terms "John Doe" and "verdict" are contained in over 500 web pages, the processor 220 adds virtual memory and virtual CPU to the computing resources. In another example, when web pages containing the term "superbowl" or terms "super" and "bowl" are viewed more than 2,500 times the processor 220 provisions an additional ten computing resources; and, when web pages containing the term "superbowl" or terms "super" and "bowl" are viewed more than 5,000 times the processor 220 provisions an additional twenty computing resources.

In at least one embodiment, resource capacity is continually increased until the actual demand, predicted demand, and/or updated predicted demand for the computing resources is above a third threshold. Thus, in the previous example, the processor 220 increases resource capacity until web pages containing the term "superbowl" or terms "super" and "bowl" are viewed more than 10,000 times (i.e., the third threshold). In another embodiment, resource capacity is increased until the resource capacity reaches a fourth threshold (e.g., maximum of 25 total servers, 500 Gigabytes of storage space). In yet another embodiment, resource capacity is only increased when the predicted demand will exceed the first threshold a predetermined number of times (e.g., resource capacity is only increased when it is predicted that the demand will be above the first threshold 5 times in a 7-day period). In still yet another embodiment, resource capacity is only increased when the predicted demand will exceed the first threshold for a predetermined amount of time (e.g., resource capacity is only increased when it is predicted that the demand will be above the first threshold for more than 24 hours).

When the predicted demand is below a second threshold, the processor 220 decreases resource capacity 330. In at least one embodiment, the second threshold is equal to the first threshold. In at least one embodiment of the invention, the resource capacity can be decreased by deprovisioning one or more computing resources. In another embodiment, the resource capacity can be decreased by removing (e.g., deallocating or physically/manually uninstalling) physical memory, virtual memory, physical CPU, virtual CPU, network capacity, instances of middleware on a virtual machine, instances of applications on a virtual machine, and/or storage space from the computing resources. For example, when web pages containing the terms "black" and "Friday" are viewed less than 1,000,000 times in a 24 hour period, the processor 220 deprovisions five computing resources. In another example, when the terms "stock" and "market" are entered into internet search engines less than 500,000 times in a 12 hour period, the processor 220 removes instances of middleware and applications on virtual machines from the computing resources; and, when the terms "stock" and "market" are entered into internet search engines less than 400,000 times in a 12 hour period, the processor 220 also removes network capacity from the computing resources.

In at least one embodiment, resource capacity is continually decreased until the actual demand, predicted demand, and/or updated predicted demand for the computing resources falls below a fifth threshold. Thus, in the previous example, the processor 220 decreases resource capacity until the terms "stock" and "market" are entered into internet search engines less than 100,000 times in a 12 hour period (i.e., the fifth threshold). In another embodiment, resource capacity is decreased until the resource capacity falls below a sixth threshold (e.g., minimum of 1 server, 5 instances of middleware on a virtual machine). In yet another embodiment, resource capacity is only decreased when the predicted demand will fall below the second threshold a predetermined number of times (e.g., resource capacity is only decreased when it is predicted that the demand will be below the second threshold more than once in a 48 hour period). In still yet another embodiment, resource capacity is only decreased when the predicted demand will fall below the second threshold for a predetermined amount of time (e.g., resource capacity is only decreased when it is predicted that the demand will be below the second threshold for 10 hours of more).

In at least one embodiment of the invention, prior to increasing or decreasing the resource capacity, the processor 220 identifies the current capacity of the computing resources. The current capacity of the computing resources can include the total number of computing resources and/or the amount of physical memory, virtual memory, physical CPU, virtual CPU, network capacity, instances of middleware on a virtual machine, instances of applications on a virtual machine, and/or storage space. Based on the current capacity of the computing resources, the processor 220 can determine whether it would be advantageous to increase or decrease the resource capacity. For example, when the predicted demand is above the first threshold, the processor 220 can determine that based on the current capacity of the computing resources, it will not increase resource capacity, i.e., the current capacity already matches the capacity needed for such a high demand. In another example, when the predicted demand falls below the second threshold, the processor 220 can determine that it will not decrease resource capacity based on the current capacity of the computing resources, i.e., the current capacity already matches the capacity needed for such a low demand.

In at least one embodiment of the invention, the system 200 further includes a computing resources managing module 230 module (also referred to herein as a "cloud interaction component") connected to the processor 220. When the predicted demand is above the first threshold, the computing resources managing module 230 receives an instruction from the processor 220 to provision one or more additional computing resources and/or to add physical memory, virtual memory, physical CPU, virtual CPU, network capacity, and/or storage space to the computing resources. As discussed above, the processor 220 can increase resource capacity until a third and/or fourth threshold is reached.

When the predicted demand is below the second threshold, the computing resources managing module 230 receives an instruction from the processor 220 to deprovision at least one computing resource and/or to remove physical memory, virtual memory, physical CPU, virtual CPU, network capacity, and/or storage space from the computing resources. As discussed above, the processor 220 can decrease resource capacity until a fifth and/or sixth threshold is reached.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
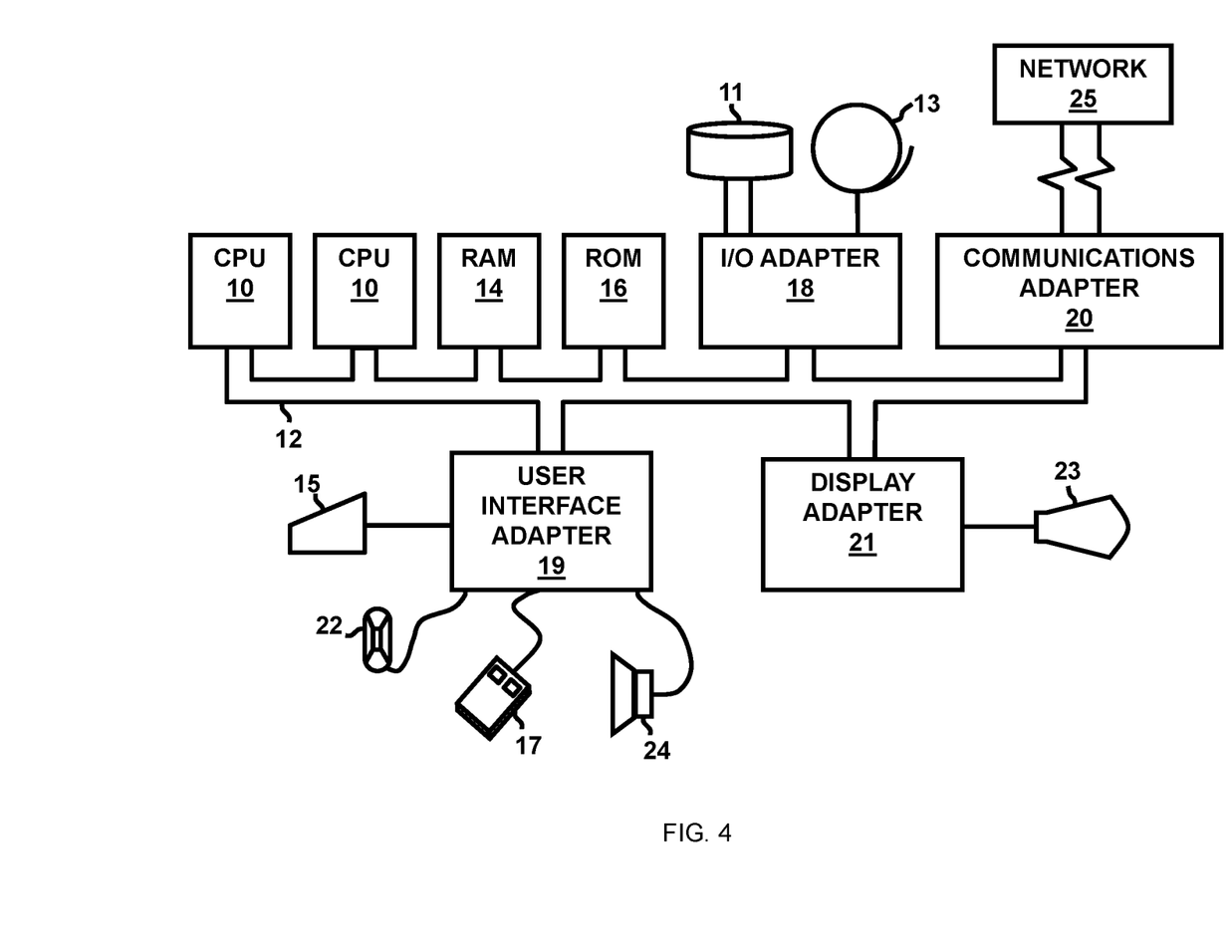
FIG. 4 illustrates a computer program product according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing computing resources, said method comprising:
    predicting, via processing circuitry, demand for the computing resources with a data analysis module based on a number of web pages that include at least one select term a predetermined amount of times and a number of times the at least one select term is entered into an internet search engine: and
    based on the current capacity of the computing resources, determining whether it would be advantageous to increase or decrease the resource capacity;
    wherein at least one of increasing resource capacity via the processing circuitry with a processor when the predicted demand is above a first threshold, wherein the resource capacity is only decreased when the predicted demand will fall below the second threshold a predetermined number of times, and decreasing resource capacity with the processor processing circuitry when the predicted demand is below a second threshold, wherein the resource capacity is only decreased when the predicted demand will fall below the second threshold a predetermined number of times.

2. The method according to claim 1, wherein said increasing of the resource capacity includes adding physical memory, virtual memory, physical CPU, virtual CPU, network capacity, instances of middleware on a virtual machine, instances of applications on a virtual machine, and storage space to the computing resources.

3. The method according to claim 1, wherein said increasing of the resource capacity includes adding at least one of physical memory, virtual memory, physical CPU, virtual CPU, network capacity, instances of middleware on a virtual machine, instances of applications on a virtual machine, and storage space to the computing resources.

4. The method according to claim 1, wherein said decreasing of the resource capacity includes removing physical memory, virtual memory, physical CPU, virtual CPU, network capacity, instances of middleware on a virtual machine, instances of applications on a virtual machine, and storage space from the computing resources.

5. The method according to claim 1, wherein said decreasing of the resource capacity includes removing at least one of physical memory, virtual memory, physical CPU, virtual CPU, network capacity, instances of middleware on a virtual machine, instances of applications on a virtual machine, and storage space from the computing resources.

6. The method according to claim 1, wherein said computing resources includes a server, a virtual machine, an application, and middleware.

7. The method according to claim 1, wherein said computing resources includes at least one of a server, a virtual machine, an application, and middleware.

8. The method according to claim 1, wherein the web pages include social networking websites, business networking websites, news stories, discussion forums, and advertisements.

9. The method according to claim 1, wherein the web pages include at least one of social networking websites, business networking websites, news stories, discussion forums, and advertisements.

10. The method according to claim 1, wherein said increasing of the resource capacity includes sending an instruction to a computing resources managing module to:
provision at least one additional computing resource; and
add physical memory, virtual memory, physical CPU, virtual CPU, network capacity, and storage space to the computing resources.

11. The method according to claim 1, wherein said increasing of the resource capacity includes sending an instruction to a computing resources managing module to at least one of:
provision at least one additional computing resource; and
add at least one of physical memory, virtual memory, physical CPU, virtual CPU, network capacity, and storage space to the computing resources.

12. The method according to claim 1, wherein said decreasing of the resource capacity includes sending an instruction to a computing resources managing module to:
deprovision at least one computing resource; and
remove physical memory, virtual memory, physical CPU, virtual CPU, network capacity, and storage space to the computing resources.

13. The method according to claim 1, wherein said decreasing of the resource capacity includes sending an instruction to a computing resources managing module to at least one of:
deprovision at least one computing resource; and
remove at least one of physical memory, virtual memory, physical CPU, virtual CPU, network capacity, and storage space to the computing resources.

14. The method according to claim 1, further comprising, prior to said increasing of the resource capacity and said decreasing of the resource capacity, identifying a current capacity of the computing resources.

15. The method according to claim 1, further comprising, prior to at least one of said increasing of the resource capacity and said decreasing of the resource capacity, identifying a current capacity of the computing resources.

16. A method device for managing computing resources, said device comprising:
processing circuitry configured to
predict demand for the computing resources based on a number of web pages that include at least one select term a predetermined amount of times and a number of times the at least one select term is entered into an internet search engine, and
based on the current capacity of the computing resources, determining whether it would be advantageous to increase or decrease the resource capacity;
wherein increase resource capacity when the predicted demand is above a first threshold, wherein the resource capacity is only decreased when the predicted demand will fall below the second threshold a predetermined number of times, and decrease resource capacity with the processing circuitry when the predicted demand is below a second threshold, wherein the resource capacity is only decreased when the predicted demand will fall below the second threshold a predetermined number of times.

17. The method device according to claim 16, wherein said increasing of the resource capacity includes adding at least one of physical memory, virtual memory, physical CPU, virtual CPU, network capacity, instances of middleware on a virtual machine, instances of applications on a virtual machine, and storage space to the computing resources.

18. A computer program product non-transitory computer-readable medium having computer-readable instructions stored thereon which when executed by a computer cause the computer to perform a method comprising:
predicting demand for the computing resources based on a number of web pages that include at least one select term a predetermined amount of times and a number of times the at least one select term is entered into an internet search engine; and
based on the current capacity of the computing resources, determining whether it would be advantageous to increase or decrease the resource capacity;
wherein increasing resource capacity when the predicted demand is above a first threshold, wherein the resource capacity is only decreased when the predicted demand will fall below the second threshold a predetermined number of times, and decreasing resource capacity with the processing circuitry when the predicted demand is below a second threshold, wherein the resource capacity is only decreased when the predicted demand will fall below the second threshold a predetermined number of times.

* * * * *